(12) United States Patent
Liu et al.

(10) Patent No.: US 6,573,965 B1
(45) Date of Patent: Jun. 3, 2003

(54) MULTI-DOMAIN WIDE VIEWING ANGLE LIQUID CRYSTAL DISPLAY HAVING SLITS ON ELECTRODES AND BUMPS ABOVE THE SLITS

(75) Inventors: Hong-Da Liu, Juipei; Chi-Yi Chen, Taichung, both of (TW)

(73) Assignee: Industrial Technology Research Institute, Hsinchu (TW)

( * ) Notice: Subject to any disclaimer, the term of this patent is extended or adjusted under 35 U.S.C. 154(b) by 29 days.

(21) Appl. No.: 09/596,313

(22) Filed: Jun. 18, 2000

(30) Foreign Application Priority Data

May 12, 2000 (TW) ......................................... 089109131

(51) Int. Cl.⁷ ........................................... G02F 1/1337
(52) U.S. Cl. ...................................... 349/129; 349/191
(58) Field of Search ................................ 349/129, 143, 349/146, 139, 122, 191, 160

(56) References Cited

U.S. PATENT DOCUMENTS

| | | | | |
|---|---|---|---|---|
| 5,309,264 A | * | 5/1994 | Lien et al. | 359/87 |
| 5,608,556 A | * | 3/1997 | Koma | 349/143 |
| 5,907,380 A | * | 5/1999 | Lien | 349/141 |
| 6,097,464 A | * | 8/2000 | Liu | 349/130 |
| 6,256,080 B1 | * | 7/2001 | Colgan et al. | 349/129 |

OTHER PUBLICATIONS

EuroDisplay '99, Sep., 1999, The 19th International Display Research Conference.

* cited by examiner

*Primary Examiner*—Toan Ton
*Assistant Examiner*—Andrew Schechter (57) ABSTRACT

A multi-domain wide viewing angle liquid crystal display (LCD) has a plurality of bump-with-slit structures formed on at least one substrate. Each bump-with-slit structure in a single pixel area includes a plurality of slits formed on the electrodes and a plurality of bumps formed above the slits. It uses the combination of bumps and electrode slits to control the directions of the pre-tilted angles of liquid crystal molecules and to form multiple domains. The capacity storage area is designed and located under the slit of the electrode. Such capacity storage area has the function of covering the disclination lines. The LCD structure decreases the color dispersion of the LCD, increases the response speed and reduces the generation of disclination lines. Moreover, the driving voltage for the LCD is lower and the process window is larger. Because the generation of disclination lines is reduced, the aperture ratio under the black matrix area of the multi-domain wide-viewing angle LCD of the invention is increased by 15% to 20% as compared to the conventional multi-domain LCD.

30 Claims, 11 Drawing Sheets

MULTI-DOMAIN WIDE VIEWING ANGLE LIQUID CRYSTAL DISPLAY HAVING SLITS ON ELECTRODES AND BUMPS ABOVE THE SLITS

FIELD OF THE INVENTION

The present invention relates generally to a structure of a multi-domain wide-viewing angle liquid crystal display (MD-WVA-LCD), and more specifically to a structure of a multi-domain wide-viewing angle liquid crystal display with a structure of slits forming on electrodes and bumps forming above the slits.

BACKGROUND OF THE INVENTION

The market for liquid crystal display (LCD) panels is increasing rapidly, especially in their applications to notebook PCs and monitors. When LCD panels of larger size and higher resolution are used for desktop monitors, wide-viewing angles (WVA) and fast response time become very critical in meeting the monitors' requirements. In addition to contrast ratio with respect to different viewing angles, gray-scale inversion, colorimetry, and the optical response of a LCD are important features of a high quality LCD panels. However, the cost associated with designing and manufacturing a panel also needs to be considered.

Controlling liquid crystal domains is the most important technology in obtaining a wide-viewing angle for an LCD. Most of the conventional LCDs are twisted nematic (TN) LCDs having an LCD panel and crossed polarizers attached outside. The drawbacks of the conventional LCDs include narrow viewing angles (±40° horizontally and ±30° vertically), slow response (about 50 ms), and large color dispersion. Therefore, it is difficult to make high quality LCD panels. In addition, the rubbing process required in manufacturing the panels causes electric static damage ESD) and particle pollution.

Because of the demand in high quality LCD panels with wide-viewing angles, the structure of multi-domain LCDs has been developed. Each pixel is divided into several domains to compensate for the asymmetry in optics so as to increase the viewing angle of the display panel. Such LCD panels have compensation films and crossed polarizers attached outside the liquid crystal display panel. The liquid crystal mode is multi-domain vertically aligned. The multi-domain LCD panel has a wide-viewing angle and small color dispersion. In addition, it does not have electric static damage and particle pollution problems because no rubbing process is required.

Figure 1:
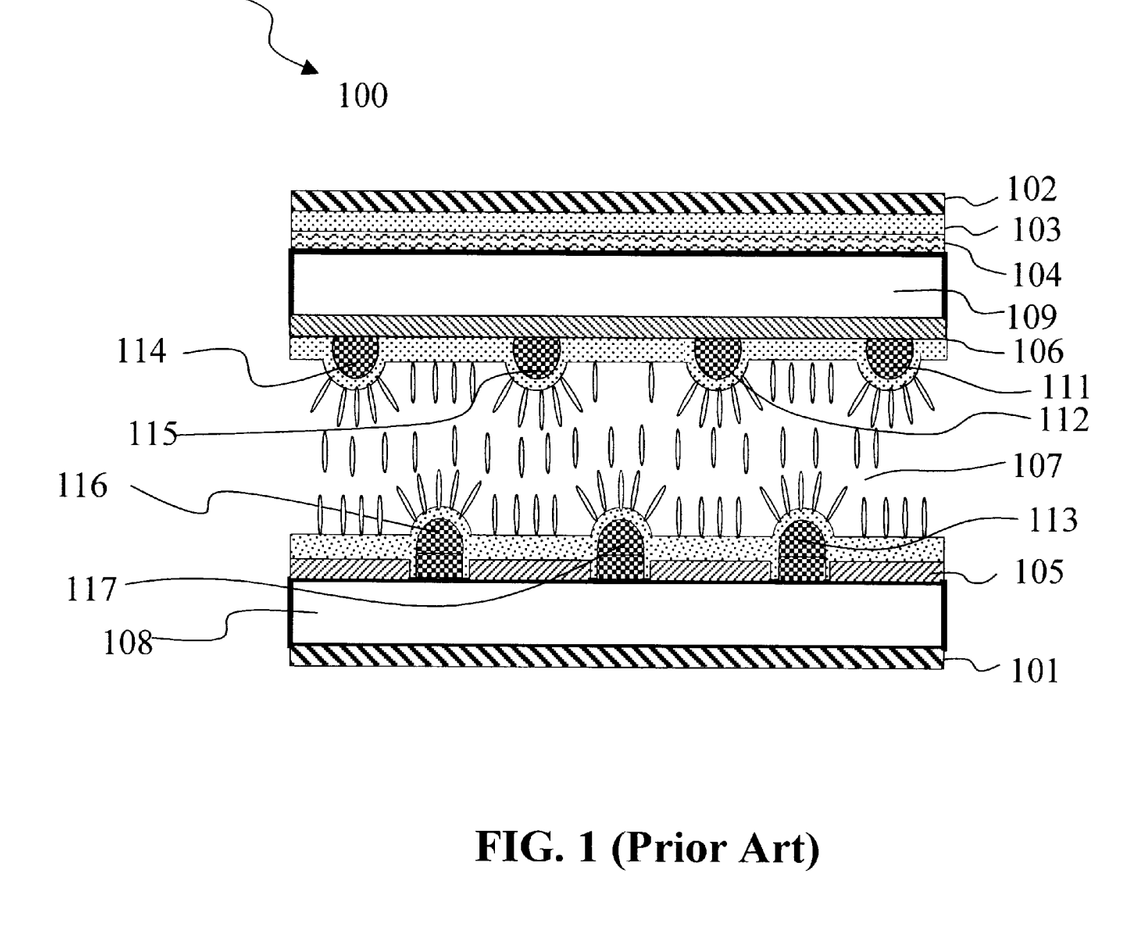
FIG. 1 is a cross-sectional view of a conventional multi-domain vertically aligned LCD with a wall-bump structure.

FIG. 1 shows a cross-sectional view of a conventional multi-domain vertically aligned LCD with a wall-bump structure. This kind of LCD uses the combination effect of a fringe field and the wall-bump structure formed on the upper and lower substrates to form a multi-domain LCD cell of multiple independent directions. Referring to FIG. 1, the LCD structure 100 comprises a liquid crystal cell (LC cell), a pair of crossed polarizers 101 and 102, compensating films 103 and 104, and a bump structure. The liquid crystal cell comprises a pixel electrode layer 105, a common electrode layer 106 and a pair of parallel substrates, such as a thin film transistor (TFT) substrate 108 and a color filter substrate 109. A liquid crystal material 107 fills the space between substrates 108 and 109. The exterior surfaces of the LC cell have respective crossed polarizers 101 and 102 disposed thereon. The compensating films 103 and 104 are applied between the crossed polarizers 101 and 102. The bump structure comprises a plurality of bumps 111~117 forming on the pixel electrode layer 105 and the common electrode layer 106 respectively. This LCD has 55% light intensity of a conventional TN LCD. Also it may generate reversed disclination lines because the angle between its bump and its pixel electrode is 45°. Moreover, the horizontal gap between the upper and the lower bumps must be less than 30 μm. It requires high precision to align. Therefore, the design specification is not easy and the process window is smaller.

Figure 2:
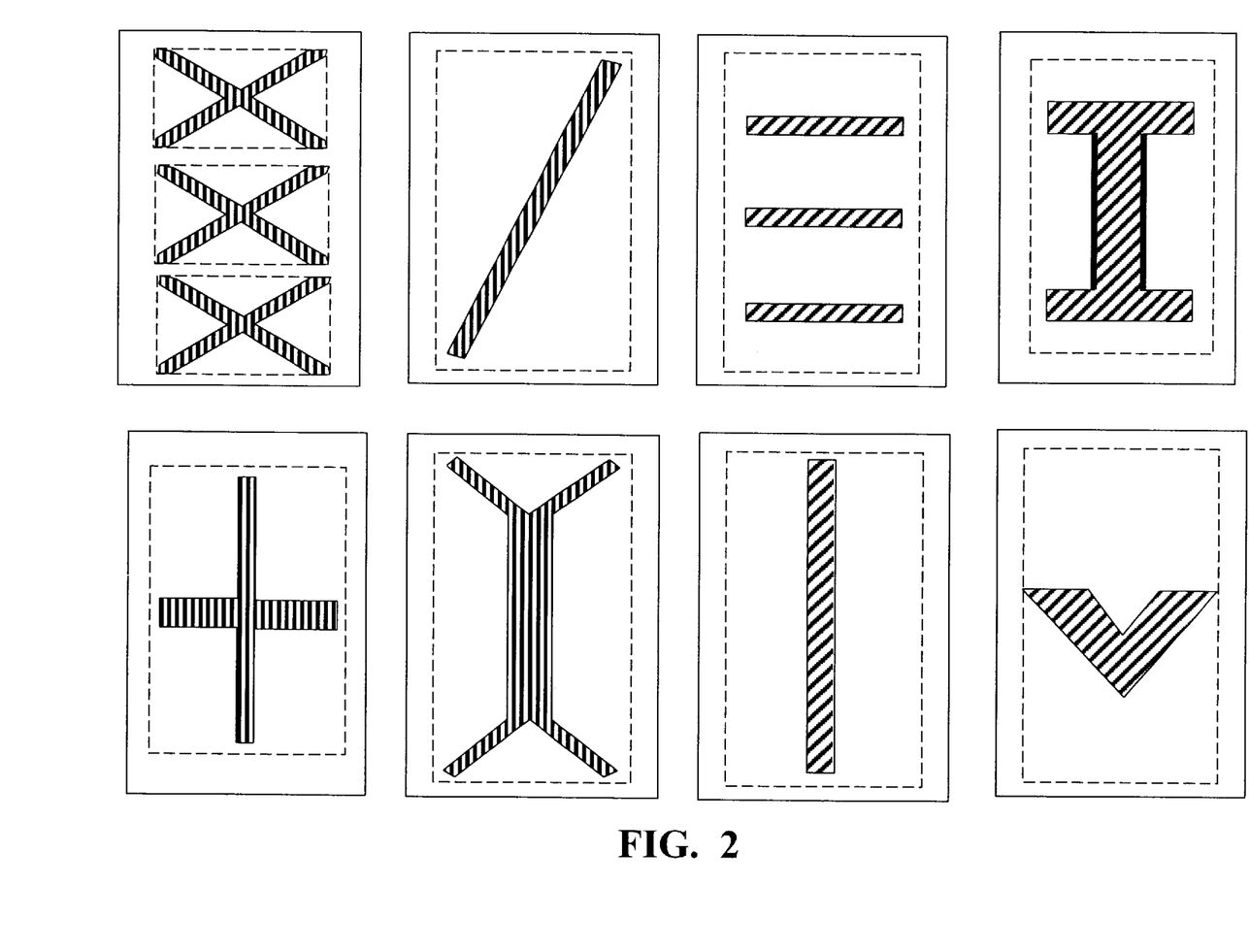
FIG. 2 shows some shapes of the opening patterns on the electrodes of a conventional multi-domain vertically aligned LCD.

U.S. Pat. No. 5,309,264 also discloses a structure of a multi-domain liquid crystal molecules that uses a common electrode layer having a plurality of openings thereon to control the tilt direction of the liquid crystal molecules and to form a multi-domain LCD cell of multiple independent directions. Therefore, the display element comprises multi-domains. FIG. 2 shows some patterns of the openings in the electrodes of this conventional multi-domain vertically aligned LCD. As shown in FIG. 2, the shapes of the opening patterns on the electrodes include "X" shape, "diagonal slot" shape and the "horizontal slot" shape, . . . , etc. This LCD needs higher driving voltage and the response time is longer.

The black matrix in the structure of the aforementioned multi-domain LCD needs to cover the disclination lines generated by reversely twisted and reversely tilted liquid crystal molecules. This reduces the aperture ratio by 15% to 20%.

SUMMARY OF THE INVENTION

The present invention overcomes the difficulties and the disadvantages of the structure of conventional multi-domain liquid crystal displays. The primary object of the present invention is to provide a multi-domain wide-viewing angle liquid crystal display with a structure of slits forming on electrodes and bumps forming above the slits. The structure having slits and bumps on electrodes may be formed on both upper and lower substrates or a single substrate.

According to the invention, the bump-with-slit structure formed on at least one substrate uses the bumps and the fringe field effect, or the so-called electrode slit effect, to control the tilt direction of the liquid crystal molecules and to form a multi-domain LCD cell of multiple independent directions. Therefore, the internal compensation of liquid crystal molecules decreases the color dispersion of the LCD, increases the response speed and reduces the generation of disclination lines. Also, the driving voltage for the LCD is lower and the process window is larger.

In addition, using existing ITO pattern processes makes it easy to modify the design of the bump-with-slit structure without adding extra process. For smaller bumps, the fringe field effect is the primary factor to consider in designing the structure of the invention and a higher driving voltage for the LCD is applied. On the other hand, for larger bumps, the effect of the boundary condition realignment of the bump is the primary factor and the LCD is driven by a lower driving voltage. The bump structure of the invention can be fabricated by a standard photo-lithographic process or a back side exposure (BSE) method.

In the preferred embodiments of the invention, the upper and lower substrates are parallel to each other. One of them has a color filter thereon and the other has thin film transistors thereon. The structure having slits and bumps on electrodes are formed on the electrode layer of at least one substrate. The structure of bumps and slits may have periodical configuration with various shapes on the substrates such as shapes of "horizontal slot", "vertical slot", "Y-inverse-Y", "X", "+", "herringbone", "T-inverse-T", or "V-inverse-V" and the combination of these shapes.

According to the invention, the capacity storage area is designed and located under the slit of the electrode. It has periodical configuration with the same shape as the slits and the bumps. Such capacity storage area has the function of covering the disclination lines and, therefore, the aperture ratio under the black matrix area of the multi-domain wide-viewing angle LCD of the invention is increased and it is higher than that of the conventional multi-domain LCDs. Because the generation of disclination lines is reduced, the aperture ratio within the black matrix area of the multi-domain wide-viewing angle LCD of the invention is increased by 15% to 20% as compared to the conventional multi-domain LCD.

The foregoing and other objects, features, aspects and advantages of the present invention will become better understood from a careful reading of a detailed description provided herein below with appropriate reference to the accompanying drawings.

DETAILED DESCRIPTION OF THE PREFERRED EMBODIMENTS

The primary operating principle of the MD-WVA-LCD in this invention is a combination effect of a fringe field and a bump structure. Based on the effect, multi-domain units are formed to provide high pre-tilted angles for liquid crystal molecules and result in an orderly alignment of the liquid crystal molecules.

Figure 3:
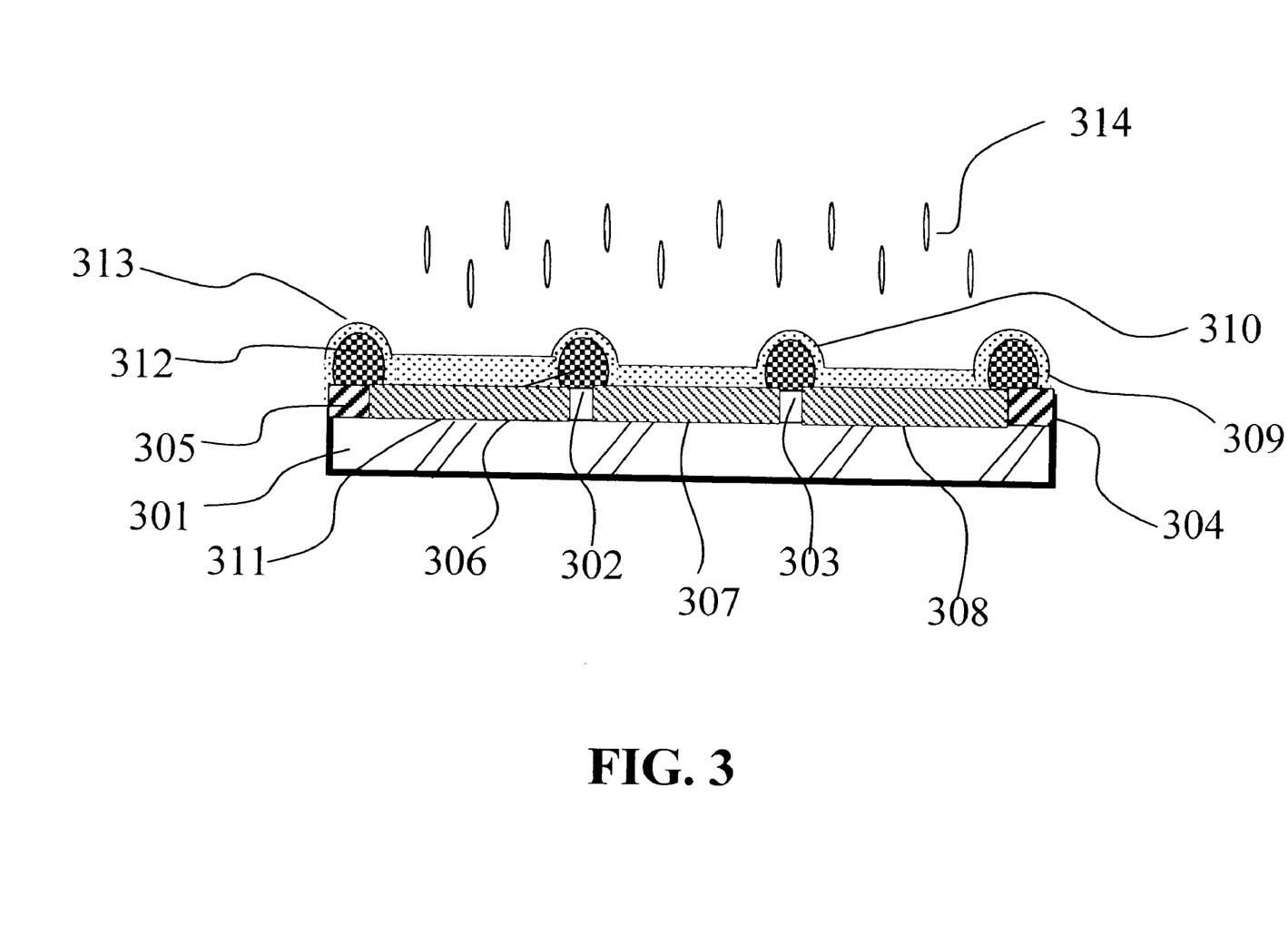
FIG. 3 is a cross-sectional view of a MD-WVA-LCD showing a single substrate having a pixel electrode layer thereon with slits and bumps formed on the pixel electrodes according to the invention, where the aspect ratio of a pixel is 1:3 and the cross section is shown along the longer side of the pixel.

FIG. 3 is a cross-sectional view of a MD-WVA-LCD showing a single substrate having a pixel electrode layer formed thereon. Slits and bumps are formed on the pixel electrode layer according to the invention. In this embodiment, the single substrate is a TFT substrate, the length and the width of the pixel are not equal, the aspect ratio is 1:3, and the cross section is shown along the longer side of the pixel.

Referring to FIG. 3, two slits 302 and 303 of a single pixel are formed in a pixel electrode layer on the TFT substrate 301. The pixel electrode is divided into three sections 306~308 by the slits 302 and 303. Bumps 309 to 312 are formed above the slits 302 and 303 and bus lines 304 and 305 respectively. The bumps 309 to 312 are covered with an alignment film layer 313.

According to the invention, the pixel electrode may be a pixel unit driven by a switching device of an active matrix. Its structure can be co-plane with, above, or below the active matrix. The active matrix may be a thin film transistor made of amorphous silicon, single silicon, poly-silicon, or low temperature poly-silicon, or a plasma address device.

The advantages of forming slits on the pixel electrodes and forming bumps above the slits are: shortening the rotating distance of liquid crystal molecules 314 directed by the bumps, increasing the optical response speed and the gray level response speed of the LCD, and reducing the generation of the disclination lines. Because the generation of the disclination lines is reduced, the transmittance within the black matrix area of the invention has 15% to 20% improvement over the conventional multi-domain LCDs.

The structure of slits may have periodical configuration with various shapes on the substrates such as shapes of "horizontal slot", "vertical slot", "Y-inverse-Y", "X", "+", "herringbone", "T-inverse-T", or "V-inverse-V" and the combination of these shapes. The structure of the slits shown in FIG. 3 has the shape of two horizontal slots. The invention uses the existing ITO pattern processes to form the slits. Therefore it is easier to modify the structure design of the electrode without adding extra process. The bump structure may be fabricated by a standard photo-lithographic process. It can also fabricated on the bus lines by a BSE method. The horizontal gap between bumps is less than 150 $\mu$m and the height of bumps is in the range of 0.5 $\mu$m to 4 $\mu$m. For smaller bumps, the fringe field effect is the primary factor to consider in designing the structure of the invention and a higher driving voltage for the LCD is applied. On the other hand, for larger bumps, the effect of the boundary condition realignment of the bump is the primary factor and the LCD is driven by lower driving voltage.

Figure 4:
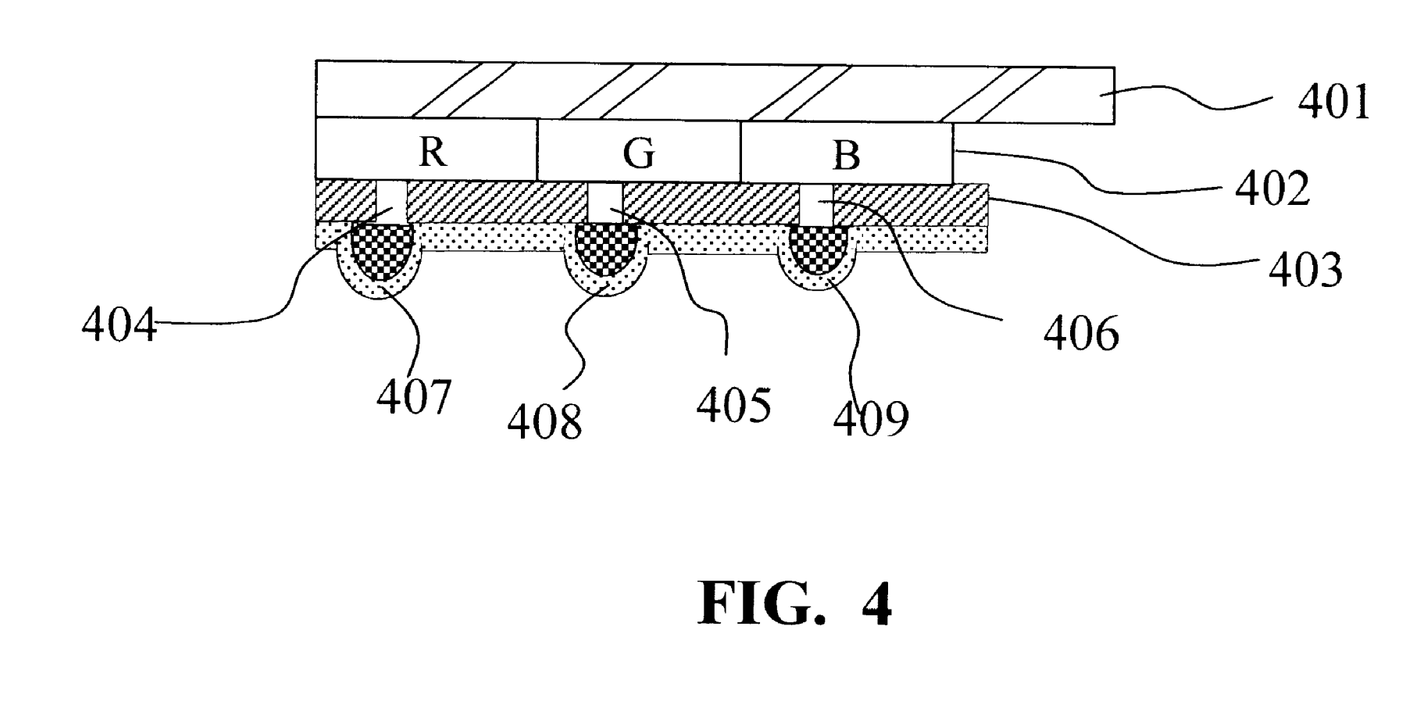
FIG. 4 is a cross-sectional view of a MD-WVA-LCD showing a single substrate having a common electrode layer with both slits and bumps formed on the common electrodes according to the invention, where the aspect ratio of a pixel is 1:3 and the cross section is shown along the longer side of the pixel.

The structure having both slits and bumps on the electrodes can also be fabricated on a common electrode layer of a single substrate as shown in FIG. 4. In the embodiment shown in FIG. 4, the single substrate has a color filter formed thereon and a common electrode layer is disposed on the color filter substrate. Slits are formed at the central portion of the pixels on the color filter substrate. The common electrode layer is continuous except the slit areas.

Referring to FIG. 4, the substrate 401 has a color filter layer 402 with red (R), green (G) and blue (B) portions thereon. A common electrode layer 403 is formed on the color filter layer 402. Three slits 404 to 406 are formed on the common electrode layer and located at the central portions of the red, the green and the blue portions respectively. Bumps 407 to 409 are formed above the slits 404 to 406 respectively, and are covered with an alignment film layer 410. Note that the layer structure shown in FIG. 4 is in reverse order as it is fabricated.

Figure 5:
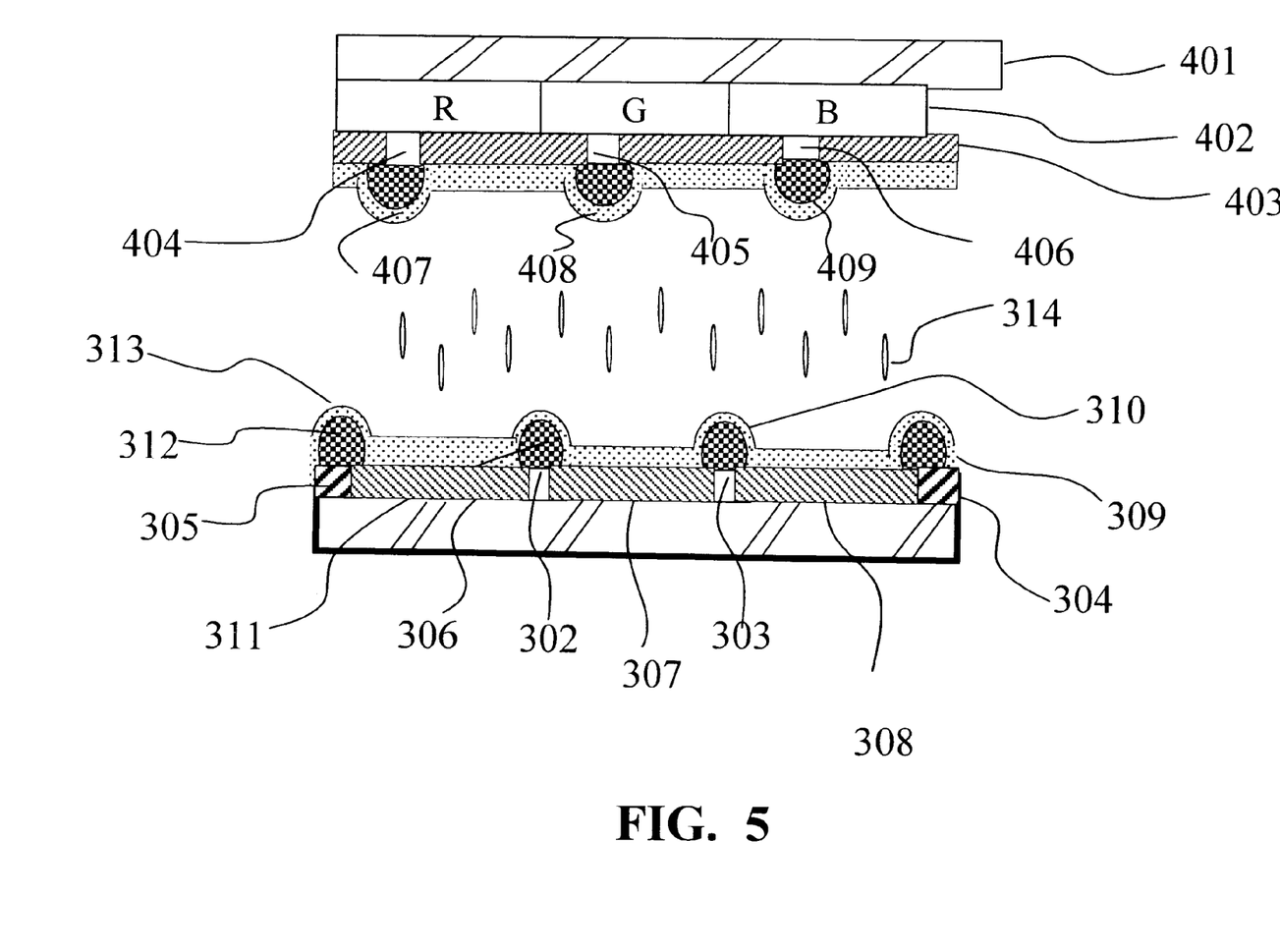
FIG. 5 is a cross-sectional view of a MD-WVA-LCD showing a pair of parallel substrates with both slits and bumps thereon according to the invention, where the aspect ratio of a pixel is 1:3 and the cross section is shown along the longer side of the pixel.

Combining FIG. 3 and FIG. 4, the structure having both slits and bumps on the electrodes can be fabricated on the upper and lower parallel substrates as shown in FIG. 5. In this embodiment, bumps on the common electrode layer stand against and are superimposed on the bumps on the pixel electrode layer. The cell gap of liquid crystals is not greater than the sum of the heights of two standing bumps on the upper and lower substrates respectively.

The width of the slit may range from 0.2 $\mu$m to 20 $\mu$m, and the width of the bump may range from 0.5 $\mu$m to 20 $\mu$m in the preferred embodiments of the present invention. The width of the slit may be greater than or less than that of the bump. Generally speaking, when the width of the slit is greater than that of the bump, it has better total effects for the redirection or realignment of the liquid crystal molecules of the multi-domain LCD according to the invention.

Bumps may be made of transparent material or non-transparent material, but non-conductive material is required. It is better that the dielectric coefficient $\in$ of the material is as small as possible. The range for $\epsilon$ is about 2 to 10. The shape of the cross-sectional view of a bump may be convex with rounded top or convex with rectangular top. The average tilted angle of a bump may range from 30° to 70°. The structure of bumps and slits may have periodical configuration with various shapes on the substrates such as shapes of "horizontal slot", "vertical slot", "Y-inverse-Y", "X", "+", "herringbone", "T-inverse-T", or "V-inverse-V" and the combination of these shapes.

Figure 6:
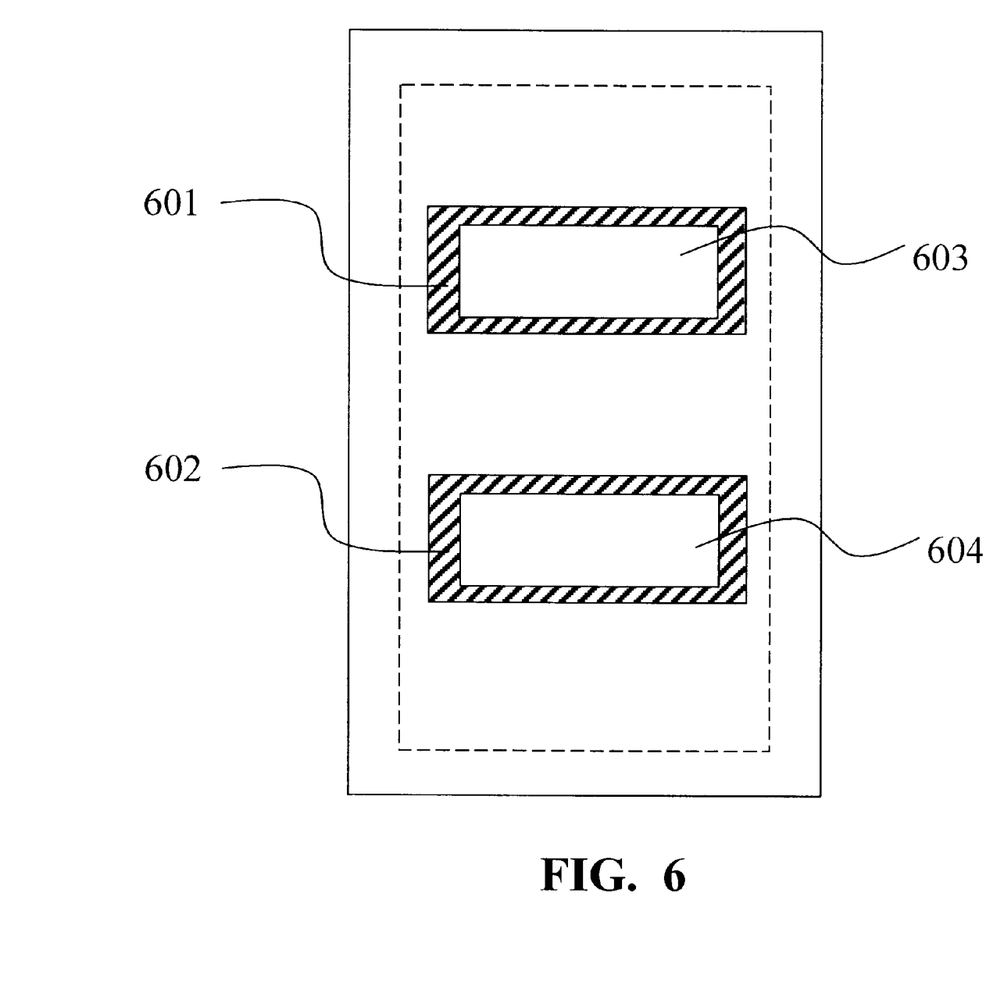
FIG. 6 shows the design of the capacity storage area of a MD-WVA-LCD according to the invention.

The capacity storage area of a conventional multi-domain LCD is designed within the black matrix area. The disadvantage of the design is that the aperture area is occupied. According to the invention, the capacity storage area is designed and located under the slits of the electrodes as illustrated in FIG. 6. The capacity storage areas 601 and 602 are located under the slits 603 and 604 designed with the same shape as the horizontal slots. This design of the capacity storage area has the function of covering the disclination lines and therefore, the aperture ratio under the black matrix area of the multi-domain wide-viewing angle LCD according to the invention is increased and it is higher than that of the conventional multi-domain LCD.

The LCD of the invention comprises at least one compensating film. The compensating film is applied between a crossed polarizer and a substrate. The compensating film can be combinations of negative birefrigence and uni-axial birefrigence, such as a C-plate and an A-plate or at least one bi-axial film.

The advantages of the multi-domain LCD of the invention will be described later and illustrated by FIG. 7(a)~FIG. 7(e). The parameters used for these figures are described as below:

splay elastic constant $K_{11}=16.6$;
twist elastic constant $K_{22}=8$;
bend elastic constant $K_{33}=18.4$;
perpendicular dielectric constant $\in_\perp=7.8$;
parallel dielectric constant $\in//=3.6$;
ordinary dielectric constant $N_o=1.4757$;
extraordinary dielectric constant $N_e=1.5584$;
viscosity $\gamma=0.156$ pas.

Figure 7A:
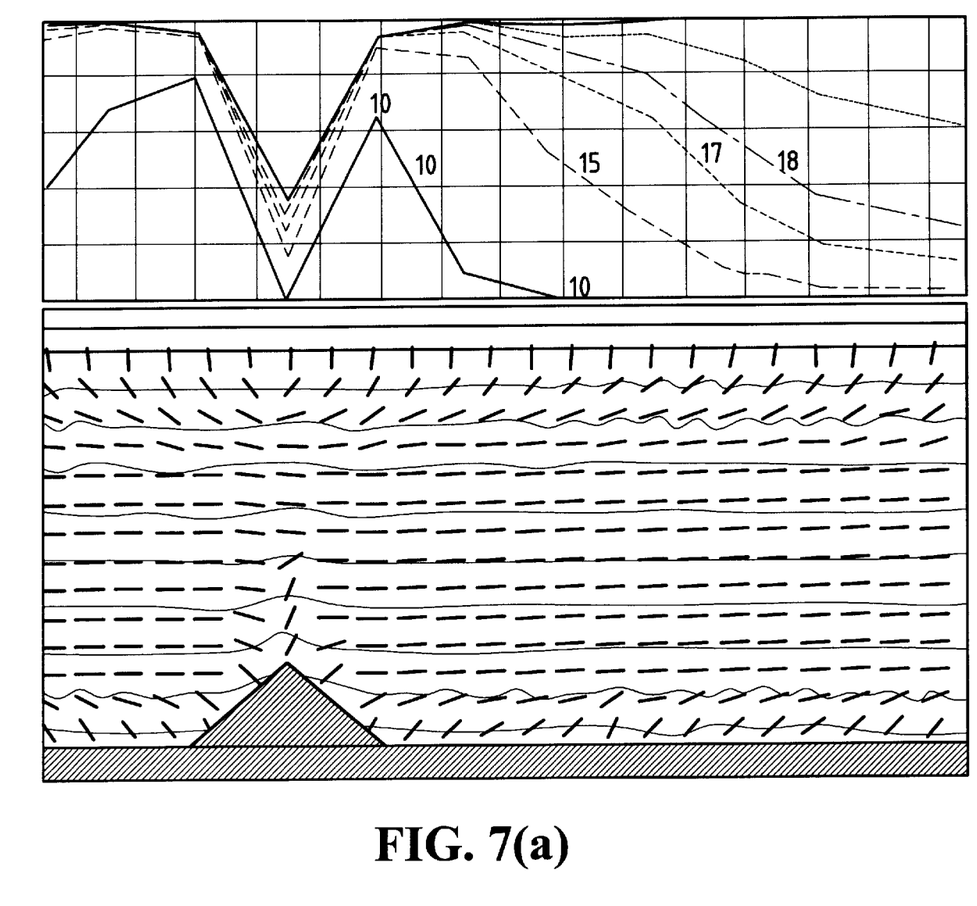
FIG. 7(a) shows the light transmittance in a single pixel area for a conventional multi-domain vertically aligned LCD with a bump on an electrode.
Figure 7B:
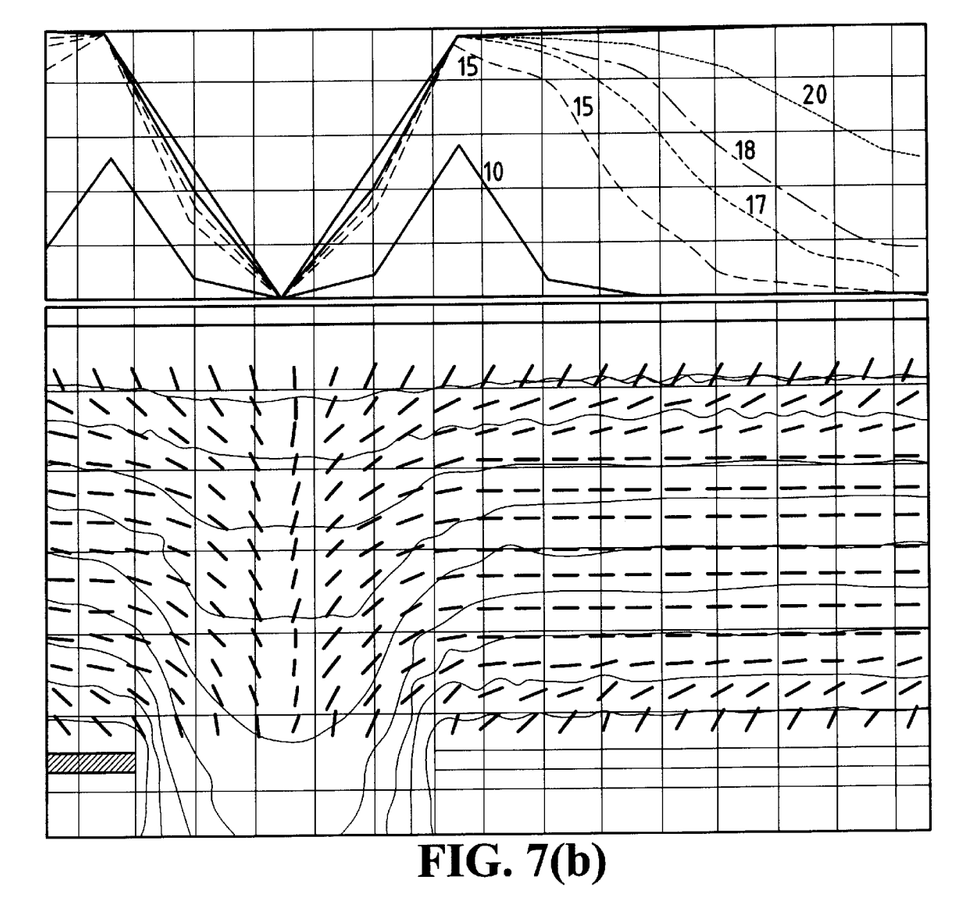
FIG. 7(b) shows the light transmittance in a single pixel area for another conventional multi-domain vertically aligned LCD with a slit on an electrode.
Figure 7C:
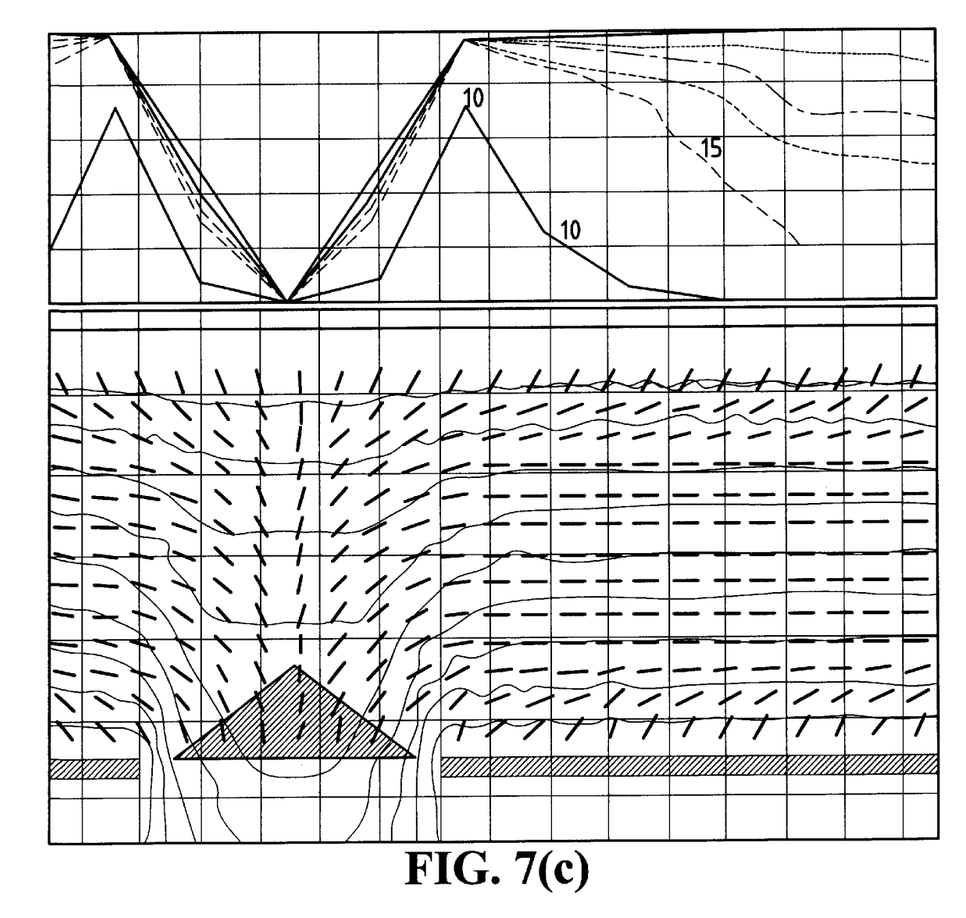
FIG. 7(c) shows the light transmittance in a single pixel area for the multi-domain LCD with a bump and a slit on an electrode according to the invention.
Figure 7D:
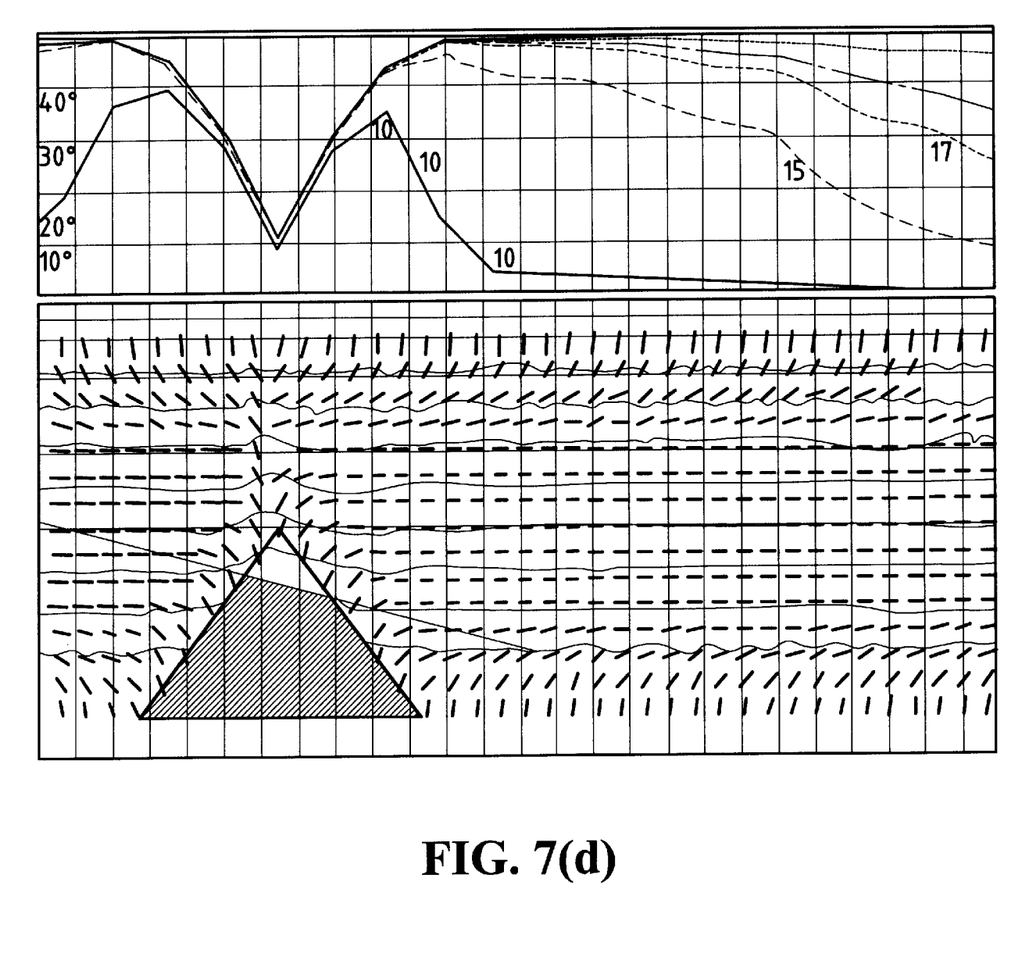
FIG. 7(d) shows the same as those in FIG. 7(a) but with a higher bump on the electrode.
Figure 7E:
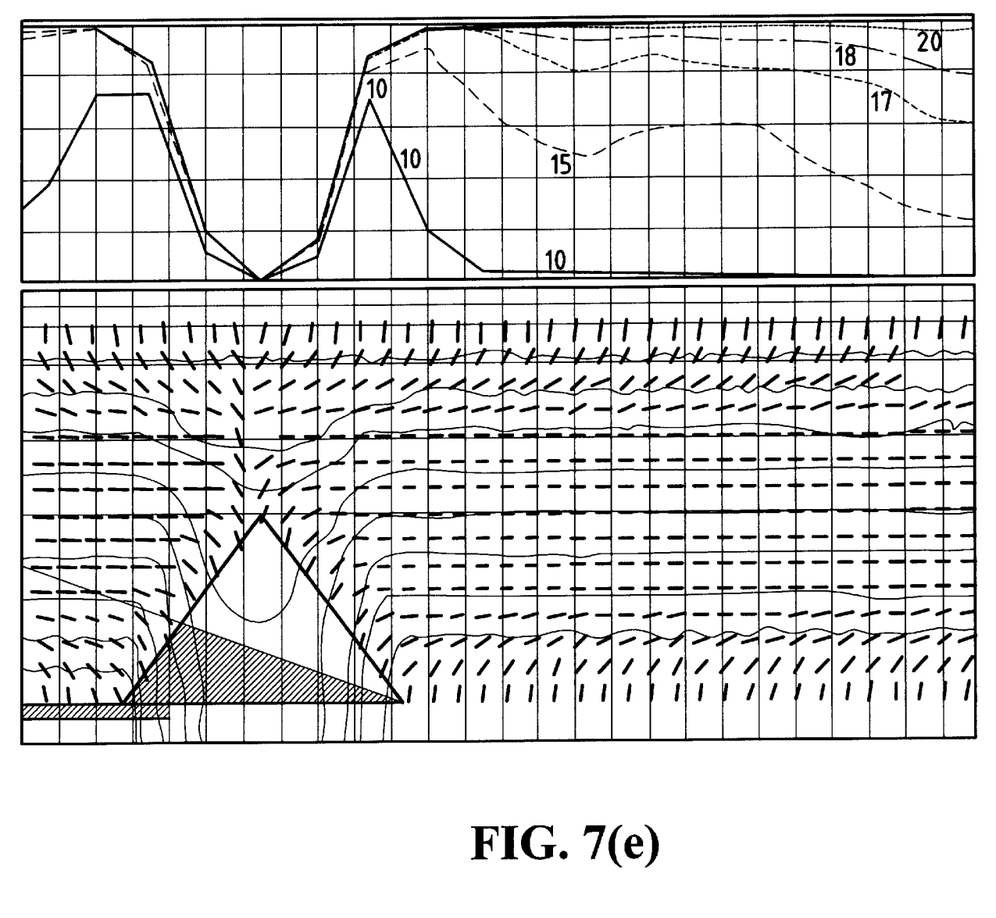
FIG. 7(e) shows the same as those in FIG. 7(c) but with a higher-bump on the electrode.

From FIGS. 7(a)~7(e), the light transmittance in a single pixel area for conventional multi-domain LCDs and the multi-domain LCD of the invention can be seen. FIG. 7(a) shows the light transmittance in a single pixel area for a conventional multi-domain vertically aligned LCD with a bump on an electrode. FIG. 7(b) shows light transmittance in a single pixel area for another conventional multi-domain vertically aligned LCD with a slit on an electrode. FIG. 7(c) shows the light transmittance in a single pixel area for the multi-domain LCD with a bump and a slit on an electrode according to the invention. FIG. 7(d) shows the same as those in FIG. 7(a) but with a higher bump on the electrode. FIG. 7(e) shows the same as those in FIG. 7(c) but with a higher bump on the electrode. In each figure, the horizontal axis x represents the relative location of the pixel while the vertical axis represents the amount of the light transmittance. All widths of the slits are the same. Six curves in each of FIGS. 7(a)–7(e) show light transmittance in a single pixel area for these LCDs at 10 ms, 15 ms, 17 ms, 18 ms, 20 ms, and 30 ms respectively after a driving voltage of 5 volts is applied.

In the embodiment shown in FIGS. 7(a)~7(c), the height of the bump is 1 $\mu$m and the width is 7.5 $\mu$m, and the width of the slit is 10 $\mu$m. Comparing each curve in FIGS. 7(a)~7(c), the curves in FIG. 7(c) show higher light transmittance at 10 ms, 15 ms, 17 ms, 18 ms, 20 ms and 30 ms respectively after a driving voltage of 5 volts is applied. For example, at the same location x of each 10 ms curve in FIGS. 7(a)–7(c), the curve in FIG. 7(c) shows higher light transmittance. In addition, comparing each curve in FIGS. 7(a) 7(c), FIG. 7(c) shows higher variation of light transmittance at the same location x for various response times. For example, comparing 15 ms curve with 10 ms curve in FIG. 7(c), the light transmittance and its variation are increased significantly at the same location x. Therefore, the response speed of the multi-domain wide-viewing angle LCD of the invention is faster than that of the conventional multi-domain LCD.

Again, comparing each curve in FIGS. 7(a)~7(c), each curve in FIG. 7(c) reveals higher values than those in FIG. 7(a) and FIG. 7(b) along the vertical axis. In other words, the light transmittance in a single pixel area for a LCD with both a bump and a slit on the electrode is higher than that of a LCD with only a bump or a slit on the electrode. Therefore, the multi-domain LCD of the invention has faster response speed than the conventional multi-domain LCD.

Now, comparing FIG. 7(a) and FIG. 7(d), both for structures having a bump on the electrode, it shows that FIG. 7(d) having a larger bump on the electrode gets higher light transmittance than FIG. 7(a) in each curve. Also, comparing FIG. 7(c) and FIG. 7(e), both having a bump and a slit on the electrode, it shows that FIG. 7(e) having a larger bump on the electrode gets higher light transmittance than FIG. 7(c) in each curve. In addition, at the curves having same light transmittance and at same duration time (say 10 ms) in FIGS. 7(a)~7(e), FIG. 7(c) and FIG. 7(e) show that the optical response is faster because the relative location of the pixel is farther away from the original reference point of the pixel. That means the structure of the multi-domain LCD of the invention drives liquid crystal molecules farther and faster than that of the conventional multi-domain LCDs. Therefore, the multi-domain LCD of the invention has faster response speed and shorter response time than the conventional multi-domain LCD.

Moreover, if the driving voltage is lowered, the light transmittance in FIG. 7(c) is significantly reduced and the response speed becomes slower. If further comparing FIG. 7(a) and FIG. 7(c), it shows that the light transmittance in FIG. 7(c) is more uniform than that of the conventional structures. Therefore, the structure of the multi-domain LCD of the invention drives liquid crystal molecules to form more uniform multiple domains.

After comparing each curve in FIGS. 7(a)~7(e), it reveals that the structure of the multi-domain LCD with both slits and bumps on the electrodes according to the invention does have best effect. Also, it is worth mentioning here that, for smaller bump and higher driving voltage, the fringe field effect is the primary factor to consider in designing the structure of the invention. Otherwise, the effect of the boundary condition realignment of the bumps is the primary factor.

Although this invention has been described with a certain degree of particularity, it is to be understood that the present disclosure has been made by way of preferred embodiments only and that numerous changes in the detailed construction and combination as well as arrangement of parts may be restored to without departing from the spirit and scope of the invention as hereinafter set forth.

What is claimed is:

1. A multi-domain wide viewing angle liquid crystal display comprising:
   a first substrate with a pixel electrode layer formed thereon;
   a second substrate with a common electrode layer formed thereon;
   liquid crystals filling a space between said first and second substrates to form a liquid crystal cell;
   at least one polarizer being disposed on exterior surfaces of said liquid crystal cell; and
   a plurality of bump-with-slit structures being disposed on at least one of said first and second substrates, each bump-with-slit structure in a single pixel area having a plurality of slits formed on at least one electrode and a plurality of bumps formed above said slits to form multiple domains based on the combination effect of a fringe field between said slits and said bumps.

2. The multi-domain wide viewing angle liquid crystal display as claimed in claim 1, further comprising a plurality of bumps formed above bus lines located around pixel electrodes on said pixel electrode layer.

3. The multi-domain wide viewing angle liquid crystal display as claimed in claim 2, wherein said plurality of bumps above bus lines are fabricated by using a back side exposure method.

4. The multi-domain wide viewing angle liquid crystal display as claimed in claim 1, each bump-with-slit structure being disposed on said pixel electrode layer of said first substrate.

5. The multi-domain wide viewing angle liquid crystal display as claimed in claim 1, each bump-with-slit structure being disposed on said common electrode layer of said second substrate.

6. The multi-domain wide viewing angle liquid crystal display as claimed in claim 5, wherein each of said slits is formed at a central portion of said pixel area on said common electrode layer.

7. The multi-domain wide viewing angle liquid crystal display as claimed in claim 1, each bump-with-slit structure being disposed on said first and second substrates.

8. The multi-domain wide viewing angle liquid crystal display as claimed in claim 7, wherein each bump-with-slit structure having a bump on said common electrode layer superimposes a corresponding bump formed around a pixel area or above a slit on said pixel electrode layer.

9. The multi-domain wide viewing angle liquid crystal display as claimed in claim 7, wherein said liquid crystal display has a cell gap not greater than the sum of the height of a bump formed on said first substrate and the height of a bump formed on said second substrate.

10. The multi-domain wide viewing angle liquid crystal display as claimed in claim 1, said polarizer being a crossed polarizer.

11. The multi-domain wide viewing angle liquid crystal display as claimed in claim 1, each of said bumps having a width in the range of 0.5 $\mu$m to 20 $\mu$m.

12. The multi-domain wide viewing angle liquid crystal display as claimed in claim 1, the horizontal gap between said bumps being less than 150 $\mu$m.

13. The multi-domain wide viewing angle liquid crystal display as-claimed in claim 1, each of said slits having a width in the range of 0.2 $\mu$m to 20 $\mu$m.

14. The multi-domain wide viewing angle liquid crystal display as claimed in claim 1, said first substrate being a substrate of thin film transistors.

15. The multi-domain wide viewing angle liquid crystal display as claimed in claim 1, said second substrate being a substrate of a color filter.

16. The multi-domain wide viewing angle liquid crystal display as claimed in claim 1, said bump-with-slit structure comprising a non-conductive and transparent material.

17. The multi-domain wide viewing angle liquid crystal display as claimed in claim 1, said bump-with-slit structure comprising a non-conductive and non-transparent material.

18. The multi-domain wide viewing angle liquid crystal display as claimed in claim 1, said bump-with-slit structure having a convex cross section with rounded top.

19. The multi-domain wide viewing angle liquid crystal display as claimed in claim 1, said bump-with-slit structure having a convex cross section with rectangular top.

20. The multi-domain wide viewing angle liquid crystal display as claimed in claim 1, said bump-with-slit structure having an average tilted angle ranging from 3° to 70°.

21. The multi-domain wide viewing angle liquid crystal display as claimed in claim 1, wherein each bump-with-slit structure comprises a plurality of slot shaped bumps and a plurality of slot shaped slits formed on at least one electrode.

22. The multi-domain wide viewing angle liquid crystal display as claimed in claim 1, wherein each bump-with-slit structure comprises an Y-inverse-Y shaped bump and an Y-inverse-Y shaped slit formed on at least one electrode.

23. The multi-domain wide viewing angle liquid crystal display as claimed in claim 1, wherein each bump-with-slit structure comprises a T-inverse-T shaped bump and a Y-inverse-T shaped slit formed on at least one electrode.

24. The multi-domain wide viewing angle liquid crystal display as claimed in claim 1, wherein each bump-with-slit structure comprises a V-inverse-V shaped bump and a V-inverse-V shaped slit formed on at least one electrode.

25. The multi-domain wide viewing angle liquid crystal display as claimed in claim 1, wherein each bump-with-slit structure comprises an X-shaped bump and an X-shaped slit formed on at least one electrode.

26. The multi-domain wide viewing angle liquid crystal display as claimed in claim 1, wherein each bump-with-slit structure comprises a +-shaped bump and a +-shaped slit formed on at least one electrode.

27. The multi-domain wide viewing angle liquid crystal display as claimed in claim 1, wherein each pixel further comprises a capacity storage area formed under a slit of a pixel electrode.

28. The multi-domain wide viewing angle liquid crystal display as claimed in claim 1, said liquid crystal display further comprising at least one compensating film disposed between one polarizer and one of said first and second substrates.

29. The multi-domain wide viewing angle liquid crystal display as claimed in claim 28, said compensating film being an A-plate or a C-plate.

30. The multi-domain wide viewing angle liquid crystal display as claimed in claim 28, said compensating film being a bi-axial film.

* * * * *